United States Patent Office 3,135,044
Patented June 2, 1964

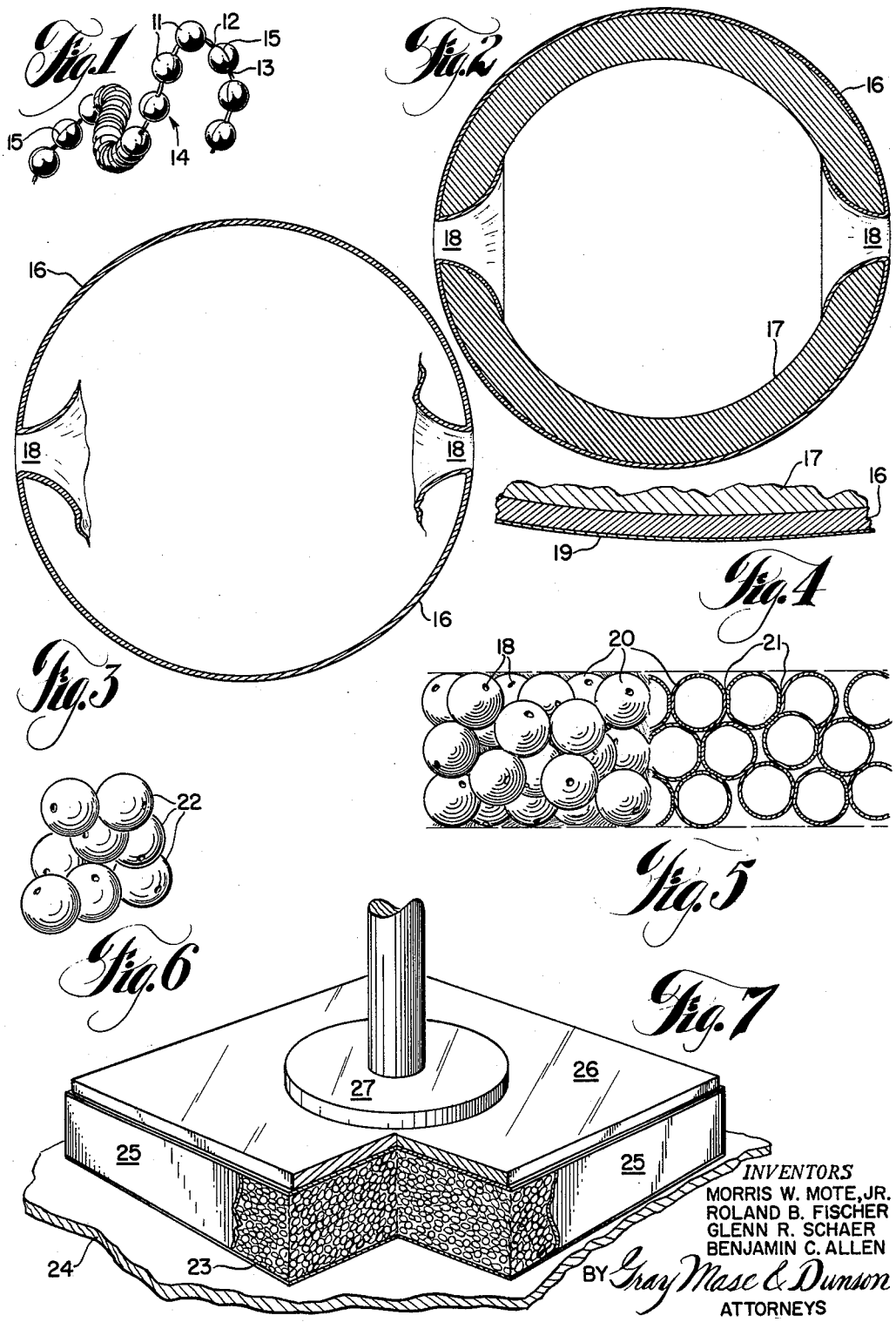

3,135,044
LIGHTWEIGHT POROUS STRUCTURES AND
METHODS OF MAKING SAME
Morris W. Mote, Jr., Pleasanton, Calif., and Roland B. Fischer, Glenn R. Schaer, and Benjamin C. Allen, Columbus, Ohio, assignors, by mesne assignments, to United Aircraft Corporation, East Hartford, Conn., a corporation of Delaware
Filed June 4, 1959, Ser. No. 818,061
8 Claims. (Cl. 29—423)

This application relates to lightweight porous structures and methods of making such structures. More particularly, it relates to bodies composed of connected hollow metal spheres and their manufacture.

Current high-temperature design, especially in the air frame and missile field, now uses primarily two types of porous structures: (1) honeycomb-sandwich construction, and (2) foamed-plastic filling in hollow metal structures. Extremely light, stiff structural members can be developed around these materials. However, both honeycomb-sandwich and foamed-plastic-filled structures have serious limitations. Honeycomb construction is expensive and difficult to form into complicated shapes. Currently available organic foams are limited to applications below 400° F., and it seems unlikely that the range will be extended appreciably in the future. Projected designs for future aircraft and other applications anticipate much higher temperatures, probably throughout the structure.

A primary object of the present invention is to provide a structure having bulk density the same as, or lower than, commercial honeycomb but with greater rigidity and strength and having a broader range of use. Another object is to provide a porous structural material for use in aircraft engine, air frame, and missile construction as well as in the building and transportation industries.

Yet another object is to provide a method for making porous structures which has significant advantages over prior methods.

According to the present invention, a plurality of small hollow metal spheres is assembled in a contacting relationship, and these spheres are thereafter joined at their contacting points. A welded or brazed collection of such small, hollow metal spheres, the shape of highest strength, has the following advantages. Since the spheres may be made from a high-melting-point metal and brazed or welded, the temperature range of the body could be far in excess of 400° F., the present limit of foamed plastics. Additionally, such spheres may be brazed or welded into complicated shapes which could not be made with honeycomb.

In this invention, a preferred method of making the hollow metal spheres comprises the steps of fixing at least one metal layer on a substantially spherical core body, the core body being composed of a material which may be selectively removed from the metal layer, and thereafter removing the core body from the metal layer. In another preferred method, a multilayer sheet is mechanically formed into spherical beads and at least one layer is selectively removed leaving at least one layer forming a thin hollow sphere.

The ramifications and scope of the present invention will be clear from the following description.

In the drawings:

FIG. 1 is a perspective view of a bead-type chain, illustrating the use to which the beads of the present invention are ordinarily put;

FIG. 2 is a view in cross section through the diametrically opposed holes of a single bead of FIG. 1 and illustrating the metal layer deposited thereon;

FIG. 3 is a view in cross section showing the hollow metal sphere remaining when the bead material has been removed;

FIG. 4 is a partial view in cross section of a segment of the surface of the bead of FIG. 2, illustrating, in addition, a layer of braze material deposited on the bead;

FIG. 5 is a view, partially in section, of porous structural material according to the present invention, the section showing the contact faces of the beads idealized;

FIG. 6 is a perspective view of a portion of the structural material of the present invention; and FIG. 7 is a perspective view, partially in section, illustrating the brazing step of the present invention.

According to the present invention, a lightweight structure may be made essentially of small hollow metal spheres. The hollow spheres can be joined by conventional silver soldering, brazing, welding techniques, or other methods, such as diffusion bonding. A silver solder composition may be placed on the spheres in three layers consisting of copper, zinc, and silver. Among other methods, the spheres may be joined by fluxing and torch heating or placing a packed collection in an atmosphere furnace. Organic bonds may be used for low-temperature applications.

These spheres may be made by fixing or coating (electroplating, dipping, painting, vapor depositing, depositing by chemical reduction, etc.) a metal layer on a spherical core material and then removing the core material by selective solution, volatilization, etc., through at least one small hole in the coat. Volatile organic cores (Paraffin, naphthalene, plastic, etc.) may be coated with the desired structural metal and then removed by volatilization through a small hole in the coat. Spheres, beads, or shot of a low-melting-point metal, such as zinc, aluminum, or cadmium can be coated with a metal having a higher melting point, such as nickel, iron, or their alloys. An alloy plate can be made by plating concentric layers of the constituent metals and homogenizing, or by plating the metals simultaneously. Ni–Cr or Fe–Ni–Cr alloys are pertinent examples. After plating, the core may be exposed at one spot by grinding or other suitable means. The core may then be removed by selective solution in acid or base, oxidation, vaporization, melting, etc. Also, hollow spheres of a desired metal, as is mentioned hereinafter, may be mechanically formed as is done in making commercial bead chains.

The preferred geometry for the hollow metal spheres of the present invention is one in which the ratio of diameter-to-wall thickness is at least about ten to one. It will be obvious that "hollow" herein does not mean having merely any size enclosed space whatever. The term "hollow" should be understood herein to encompass thin-wall structures only, e.g., where the ratio of diameter to wall thickness is at least about ten to one. Highly preferred in the present invention are hollow spheres having a ratio of diameter to wall thickness of from about 90:1 to about 20:1.

According to a preferred embodiment of this invention as illustrated in the drawings, hollow spheres containing at least one hole are used individually as a core or mandrel upon which a thin metal layer may be fixed or deposited. Such a sphere may herein be called a "bead." The material of which the bead core or mandrel is composed must be such that it may be selectively removed from the deposited metal layer after the fixing or deposition step.

With reference to FIG. 1, hollow spheres 11 containing two diametrically opposed holes 12 and 13 are made commercially and appear on the market joined in the form of bead chain 14, having a variety of familiar uses. These beads are made by forming a metal strip into a tube and beading it into a multi-depression die which gradually forms the tube into individual spheres or around links of chain. Such beads are presently made with outside diameters ranging from 1/16 to 3/8 inch and respective thicknesses of from 9 to 20 mils (1 mil equals 0.001 inch) in a variety of materials including aluminum, magnesium, brass, copper, silver, steel, stainless steel, and nickel. Thinner wall thicknesses are not now available because the forming operation requires a certain amount of rigidity or the bead collapses. The normal hole diameters range from 40 to 70 mils depending on the bead size and an unwelded seam 15 extends on one side from hole to hole. By use of a special mandrel, 3/16-inch-diameter beads were made with a hole size of only 15 mils.

According to this invention and with reference to FIG. 2, a thin layer 16 of the metal desired in the final product is deposited on a core bead 17, such as has been above described. A preferred core material is aluminum since, by a relatively simple caustic treatment, the aluminum core may be removed from useful metal layers which may be deposited upon it.

The metal layer 16 may be deposited on the core 17 by electroplating, depositing by chemical reduction, or other methods. Electroformed layers of nickel or iron are preferred in the present invention, with the mandrel material being aluminum beads. A layer 16 of metal at least 1 mil thick is preferred, the optimum thickness of most metals being at least 1.5 to 2 mils. When the metal layer 16 has been formed, the core material 17 is removed through the hole or holes 18 appearing in the core bead 17. This may be done by any suitable method as those skilled in the art may determine. Highly preferred for removing an aluminum core from a nickel or iron layer is treatment with a hot caustic. Boiling in sodium hydroxide (100 to 250 grams/liter) for about 1 to 6 hours, depending on the hole size in the bead, is suitable.

FIG. 3 illustrates the thin spherical shell 16 remaining after the core material 17 has been selectively removed. FIGS. 2 and 3 illustrate the process of the present invention using 3/16-inch diameter core beads 17 with a 2-mil metal coat 16, the thickness of the core material 17 being about 15 mils and the diameter of the hole 18 being about 15 mils.

FIG. 4 illustrates a segment of the outer part of the bead of FIG. 2 in section, additionally showing a thin layer 19 of braze material placed over the coat of structural metal 16. This thin layer 19 of a fusible braze metal is satisfactory when in the range of thickness of 0.1 to 1.7 mils, 0.1 to 0.2 mils being preferred.

In another preferred embodiment of the present invention, hollow spheres may be made by forming a two-layer metal sheet, consisting of a layer of core or backing material, say, aluminum, and a layer of metal structural material, e.g., iron or nickel, or iron-base or nickel-base alloys, into beads, as mentioned above and shown in the attached drawings. Then the backing material may be removed to leave a hollow metal sphere. A three-layer strip, which may be illustrated also by FIG. 4, consisting of a core layer 17, a metal layer 16 thereon, and a braze layer 19 on the metal layer, may be formed into beads also. Then, upon removal of the core material, the resulting hollow metal spheres will have precoated thereon a braze layer and will be immediately ready for assembly into a porous structure. The backing material 17 may be situated adjacent braze layer 19 rather than adjacent the metal layer 16 so that when beads are formed the backing material 17 will be externally situated and may be more easily removed; holes in the beads would then be unnecessary. It is preferred that the metal layer or layers placed on the sheet backing layer be from about 20 percent to about 100 percent as thick as the sheet backing material.

This alternative method would eliminate the steps of plating on the spherical core material. In the present state of the art, metal thicknesses of less than about 8 mils are not suitable for forming into beads, since a sufficient body of metal is not available for the bead manufacturing operation, and thicker metals are necessary for beads of greater than 1/16-inch diameter. Thus, in making porous bodies according to the present invention, if extremely light structures are desired, mechanically manufactured beads cannot be directly assembled, and the use of a removable core material is dictated.

In the present invention, the holes in the aluminum bead core should be large enough to get the aluminum out, yet small enough so that little substantial deposit of braze is made on the inside of the hollow sphere. For example, for a 3/16-inch-diameter core bead, a 15- to 45-mil hole size is satisfactory, with a hole size of 20 to 30 mils being highly preferred.

Hollow metal spheres formed by the above processes and others may thereafter be bonded together to form a lightweight porous structure, as illustrated in FIGS. 5, 6, and 7.

As shown in FIG. 5, hollow spheres 20 have been bonded together to form a lightweight porous structure. The contact faces 21 in FIG. 5 are shown idealized. In FIG. 6, a body formed by hollow spheres 22 is shown in perspective.

FIG. 7 illustrates one preferred method of forming hollow metal spheres into a unitary porous structure. Hollow spheres 23, coated with a thin layer of a braze material are assembled in the enclosure formed by platform bed 24 and side panels 25. After full packing, platen 26 is placed on the assembled spheres 23 and a small weight 27 is applied to the assembly to promote bonding. The spheres may thereafter be furnace-brazed to form a unitary body. If desired, the spheres may be brazed not only to each other but also to the enclosing structural members 24, 25, and 26. Furnace brazing in a hydrogen atmosphere is satisfactory. For small hollow metal spheres having walls 2 to 3 mils thick, a preferred load during brazing is 10 to 20 grams per square inch. It is highly preferred that the dimensions of the spheres be small compared to the dimensions of the outer form, i.e., smaller than about one-third (in diameter) the smallest dimension of the form.

After a plurality of hollow metal spheres have joined to form a porous body according to the present invention, the body may be trimmed to a specified useful shape and thereafter, if desired, bonded to at least one structural member.

This invention thus provides a lightweight, porous, metallic structure comprising a plurality of small hollow metal spheres bonded together at their contacting points. This plurality of spheres may be situated within an outer structural form and bonded both together and to the form. In this porous structure of this invention, it is highly preferred that the spheres be small compared to the dimensions of the form.

Electroformed nickel or iron spheres having wall thicknesses of 1.5 to 2 mills and about a 1/8-inch diameter may be brazed together to yield a structural material having a bulk density of approximately 0.2 gram per cubic centimeter. More massive hollow spheres will, of course, provide a higher bulk density when bonded together to form a body.

*Example 1*

Hollow aluminum (material designated 1100 by the Aluminum Association) beads, 3/16 inch in diameter and 13 mils thick, were used as a mandrel material. The beads contained two diametrically opposed holes each 15 mils in diameter. The aluminum bead mandrels were cleaned by dipping in an alkaline solution (a weak solution of sodium hydroxide is sufficient) and rinsing. The beads were filled with water at room temperature, to prevent them from floating in the plating bath, by applying sufficient vacuum to boil the water at room temperature while they were submerged. The following nickel-plating bath was used to electroplate a layer of nickel on the beads in a conventional horizontal plating barrel:

| | |
|---|---|
| Nickel sulfate ($NiSO_4 \cdot 6H_2O$) | 16 oz./gal. |
| Ammonium fluoborate ($NH_4BF_4$) | 3 oz./gal. |
| Water | Balance |

The operating conditions of the bath were:

| | |
|---|---|
| Temperature | 140° F. |
| Volts | 5 |
| pH | 5.0 to 6.0 |
| Plating rate | 0.4 mil/hour |
| Amperes | 4.0 |

A layer of nickel about 2.3 mils thick was electroplated on the aluminum bead mandrels. The aluminum core was then removed from the nickel layer by boiling the beads in sodium hydroxide (100 grams per liter). A six-hour treatment for complete removal was used, although 95 percent of the aluminum was stripped after 15 minutes. The resulting hollow nickel spheres were then plated with about 0.1 mil of silver to act as a braze material.

The following procedure was used to plate silver braze metal on the hollow nickel spheres:

(1) Clean spheres cathodically in an alkaline cleaner.
(2) Rinse.
(3) Dip in 4 weight percent hydrochloric acid.
(4) Rinse.
(5) Dip in 10 grams per liter sodium cyanide solution.
(6) Copper strike plate 1 minute to check for complete cleaning. (This copper is not necessary for brazing.)
(7) Rinse.
(8) Silver strike plate 1 minute at 2 amperes for a batch of beads having a volume of 50 cm.³.
(9) Silver plate for 8 minutes at 1 ampere.

The silver strike bath contained

| | |
|---|---|
| Silver cyanide (AgCN) | 1 g./l. |
| Sodium cyanide (NaCN) | 100 g./l. |
| Water | Balance | and was operated at 70° F.

The silver-plating bath contained

| | |
|---|---|
| Silver cyanide (AgCN) | 30 g./l. |
| Free potassium cyanide (KCN) | 20 g./l. |
| Potassium carbonate ($K_2CO_3$) | 30 to 90 g./l. |
| Water | Balance | and was operated at 70° F.

The resulting silver-plated hollow nickel spheres were then packed into a quartz test tube, large compared to the size of the spheres. A stainless steel weight was placed on the packed spheres to provide a load of about 12 grams per square inch. The aggregate of hollow spheres was then furnace-brazed at about 2100° F. in a hydrogen atmosphere for about 10 minutes. The hot-zone dew point of the dried hydrogen used was kept lower than +20° F.

The resulting porous structure had good quality joints and a bulk density of about 0.25 gram per cm.³.

*Example 2*

Same as Example 1 except that the structural metal with which the aluminum beads were plated was iron instead of nickel and the layer of braze material was copper rather than silver.

The following iron-plating bath was used to electroplate a layer of nickel on the beads in a conventional horizontal plating barrel:

| | |
|---|---|
| Ferrous ammonium sulfate ($Fe[NH_4]_2[SO_4]_2 \cdot 6H_2O$) | 32 oz./gal. |
| Ammonium fluoborate ($NH_4BF_4$) | 2 oz./gal. |
| Ammonium hydroxide ($NH_4OH$) | To give pH 5.5 |
| Water | Balance | and operating conditions were:

| | |
|---|---|
| Temperature | 140° F. |
| pH | 5.0 to 6.0 |
| Volts | 4.0 to 4.5 |
| Anodes | Globe iron |

The following plating bath was used for depositing copper:

| | |
|---|---|
| Copper cyanide (CuCN) | 12 oz./gal. |
| Potassium cyanide (KCN) | 20 oz./gal. |
| Potassium sodium tartrate ($KNaC_4H_4O_6 \cdot 4H_2O$) | 2 oz./gal. |
| Potassium hydroxide (KOH) | To give pH 12 |
| Water | Balance | and operating conditions were

| | |
|---|---|
| Temperature | 120° F. |
| Volts | 5 |
| pH | 11 |

The many changes, substitutions, and ramifications inherent in the present invention will be obvious to those skilled in the art. Thus the teachings herein should be deemed exemplary rather than limiting.

What is claimed is:
1. The method of making thin-walled, hollow, spheres of a structural metal comprising the steps of forming perforated beads, electroforming a layer of a structural metal on said beads, and removing the bead material from inside said electroformed metal layer through said perforations leaving a sphere formed of the electroformed metal shell.
2. The method of making lightweight, porous metallic structures, comprising, providing thin-walled hollow structural metal spheres coated with a thin film of a brazing metal, assembling said spheres in multiple layers extending in all directions and in contacting relationship with one another, heating said spheres under pressure to join them together at their points of contact, trimming the resulting assemblage to a required shape, and bonding outer structural members to said trimmed assemblage.
3. The method of making thin-walled, hollow, metal spheres comprising the steps of mechanically preparing a substantially spherical aluminum core body, applying at least one metal layer on the aluminum core body, providing access to said core body through the metal layer, and removing the aluminum core through said access by means of a suitable caustic agent to leave a metal sphere product.
4. The method of making thin-walled, hollow metal spheres comprising the steps of mechanically preparing a substantially spherical core body, applying at least one layer of a structural metal on the core body, applying a layer of a fusible brazed metal over the structural metal layer, providing access to said core body through the structural metal layer and the fusible brazed metal layer, and removing the core body through said access to leave a metal sphere product.
5. The method of making thin-walled hollow metal spheres comprising the steps of mechanically preparing a substantially spherical core body, applying at least one layer of a structural metal on the core body, applying a fusible layer of brazed metal over the structural metal layer, said fusible brazed metal layer having a thickness of between about 0.1 and 1.7 mils, providing access to said core body through the structural metal layer and the fusible brazed metal layer, and removing the core body through said access to leave a metal sphere product.

6. The method of claim 3 wherein the thin metal layer has a thickness of between about 1 and 3 mils.

7. The method of claim 4 wherein the layer of the structural metal has a thickness of between about 1 and 3 mils.

8. The method of claim 1 wherein the electroformed layer of structural metal formed on the beads has a thickness of between about 1 and 3 mils.

References Cited in the file of this patent

UNITED STATES PATENTS

| | | |
|---|---|---|
| 1,060,361 | Rea | Apr. 29, 1913 |
| 1,266,485 | Kingston | May 14, 1918 |
| 1,587,404 | Nicholson | June 1, 1926 |
| 1,591,372 | Gafvert | July 6, 1926 |
| 2,022,234 | Everett | Nov. 26, 1935 |
| 2,042,635 | Schellens | June 2, 1936 |
| 2,423,870 | Blessing | July 15, 1947 |
| 2,499,977 | Scott | Mar. 7, 1950 |
| 2,602,614 | Cole | July 8, 1952 |
| 2,682,700 | Simoneau | July 6, 1954 |
| 2,806,509 | Bozzacco | Sept. 17, 1957 |
| 2,900,713 | Young | Aug. 25, 1959 |
| 2,936,519 | Blackman | May 17, 1960 |
| 2,956,651 | Allred | Oct. 18, 1960 |
| 2,985,411 | Madden | May 23, 1961 |

FOREIGN PATENTS

| | | |
|---|---|---|
| 858,058 | Germany | Dec. 4, 1952 |